Feb. 3, 1931.                C. BROSZEIT                1,790,971
                    TESTING MEANS FOR PERCUSSIVE TOOLS
                          Filed April 25, 1929

INVENTOR
C.BROSZEIT
BY          ATTY.

Patented Feb. 3, 1931

1,790,971

UNITED STATES PATENT OFFICE

CARL BROSZEIT, OF ESSEN, GERMANY

TESTING MEANS FOR PERCUSSIVE TOOLS

Application filed April 25, 1929, Serial No. 358,126, and in Austria January 25, 1929.

This invention is directed to a testing means for percussive tools wherein the transposing motions of the tool are accurately recorded.

Testing devices for percussive tools have heretofore been provided with a registering mechanism in the form of a counter by which the number of transposing motions of the tool in a predetermined time have been indicated. This testing device is effective only for determining the number of transposing motions which have occurred with respect to a predetermined number of blows of the tool and does not serve in any way to indicate the possible irregularities which may exist in the transposing motions of the tool.

The primary object of the present invention is, therefore, to provide a testing device in which each transposing motion of the tool is accurately recorded, the record finally presenting a graphic illustration of the succession and series of any missed transpositions in the event such should exist.

The invention further contemplates the combination with such automatic recording of transposing motions, of means for graphically illustrating and recording the number of blows or the strength of the blows of the tool and particularly to record both such indications upon a common writing surface to provide for conveniently comparing the result.

A further object of the invention is the provision of means whereby the recording of the transposing motions of the tool and of the number and strength of the blows of the tool are combined into a single record, the graphic reproduction of which is the combined result of the transposing of the tool and of the operative blow thereof.

The invention is illustrated in the accompanying drawings, in which.

Figure 1:
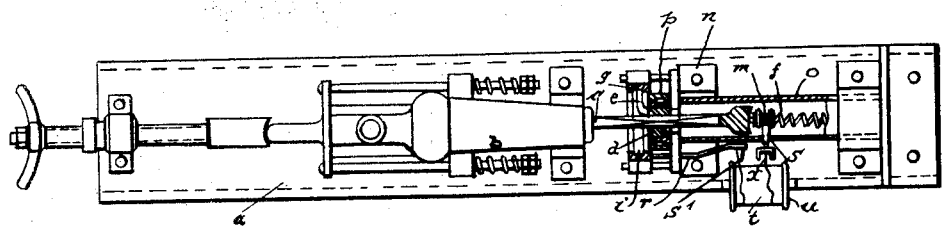
Figure 1 illustrates a testing device in which the transposing motions and blows of the tool are independently recorded upon a single writing surface or upon independent uniformly driven surfaces.

In the form illustrated in Figure 1, wherein the respective operations of the tool are independently recorded, a suitable base frame $a$ is arranged to receive the usual tool $b$, here shown as a hammer drill having an operating chisel $c$. At one end of the frame is mounted a cylindrical housing $o$ in which is arranged a spring $f$ to directly receive the blows, that is the reciprocating movements, of the chisel $c$.

Secured in a block $m$ carried by the spring is an arm $s$ which extends through an elongated opening in the housing $o$ and carries a marking implement $x$ adapted to draw a line upon a record sheet $t$ mounted upon suitable supporting and driving mechanism arranged upon the base. The particular character of the record sheet or the means for regularly feeding the same beneath the marking implement is immaterial and no particular means to this end is necessary to describe or illustrate.

A block $n$ is mounted on the base encircling one end of the housing $o$ and a collar $d$ is arranged upon the block to receive the chisel. This collar $d$ is so formed for cooperation with the chisel as to partake of the transposing motions of the chisel while at the same time being capable of more or less freedom of movement vertically of the chisel.

The collar $d$ is provided with an arm $e$ which seats in a guide $g$ supported by the block $n$. This guide $g$ is interiorly formed with a channel to receive the end of the arm $e$ and this channel $i$, which is of endless form, is, when developed, of undulating form, presenting in uniform curvature a portion of maximum altitude, that is of maximum projection toward the tool proper and a diametrically opposed portion of maximum projection in a direction away from the tool proper. That is to say, the arm $e$ in following the channel $i$ is caused in each revolution to move the maximum distance toward the tool proper and the maximum distance away from the tool proper at diametrically oppoiste points. The collar $d$ has a ring $p$ surrounding the same and so connected therewith as to follow the longitudinal movements of the collar $d$ but held against a similar rotative movement. This ring $p$ is provided with an arm $r$ having a writing point $s'$ which overlies the recording surface $t$.

In this form, it is apparent that the spring $f$ will respond to the blows of the tool and that the movements of the spring $f$ are graphically illustrated by the writing implement $x$ on the recording surface $t$. All transposing motions of the tool correspondingly operate the collar $d$ and as the arm $e$ of this collar, in following the channel $i$, is also compelled to a reciprocating movement, it is apparent that the ring $p$, in following this reciprocating movement, will correspondingly move the arm $r$, the movements of which will be indicated on the record surface by the marking implement $s'$.

Figure 2:
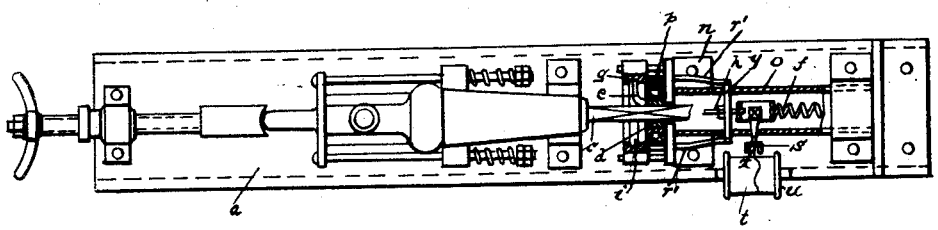
Figure 2 is a similar view showing the transposing motions and blows of the tool combined in a single record.
Figure 3:
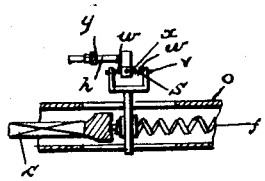
Figure 3 is an enlarged sectional detail illustrating particularly the combined effects of the tool on the single writing implement.
Figure 4:
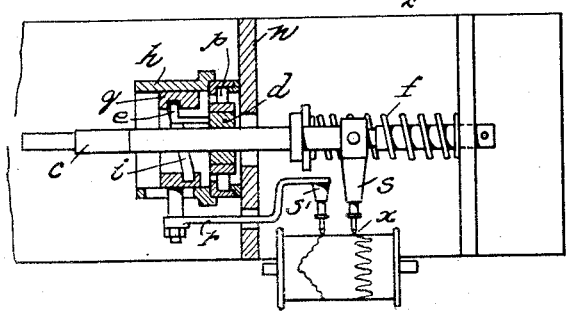
Figure 4 is an enlarged sectional view of one form of testing means.

In the form shown in Figures 2 and 3, the recording of both the blows of the tool and of the transposing motions thereof is by means of a single record. Here, the base, cylindrical housing, spring, collar, arm and controlling channel are identical with the form previously described and are indicated in Figures 2 and 3 by similar reference numerals. In this form, however, the arm $s$, which is carried by the spring $f$, or more particularly the writing implement $x$ carried by said arm, is mounted for sliding movement upon a pin $v$ and normally held in balanced position thereon by opposing springs $w$. The ring $p$ is provided with two arms $r'$ which are connected by a cross rod $y$ in which is adjustably arranged a pin $h$ which is in line with the writing implement $x$.

In this form, the writing implement $x$ responds to the movements of the springs under the influence of the blows of the tool and at the same time is operated in response to the pressure or lack of pressure by the pin $h$ which is controlled solely by the transposing motions of the tool incident to the cooperation of the arm $e$ and channel $i$, as heretofore described. Therefore the graphic record in this form of the invention, if uniform in its lateral deviations on both sides of the normal line of marking, will indicate a uniformly recording transposition of the tool, for this writing implement responds uniformly to the transposing movements. If, however, two or more strokes of the writing implement of equal length follow in the line after one another, there is a clear indication that at these points the transposing means for the tool has failed of operation.

It is, of course, apparent that the improved testing device is usable for testing the blow in a number of blows of the tool where the tool is of a character which does not combine simultaneous transposition, as in this event the transposing means of course will not record.

What is claimed to be new is:

1. A testing device for percussion tools, including a writing implement, a recording surface on which said implement operates, and means for simultaneously subjecting the implement to a movement responsive to the blows of the tool and to a movement responsive to the transposing motions thereof.

2. A testing device for percussion tools, including a spring responsive to the blows of the tool, a writing implement carried by the spring and movable therewith, a recording surface on which the implement acts, an element responsive to the transposing motions of the tool, and means operated by the element for acting on the writing implement.

In testimony whereof I affix my signature.

CARL BROSZEIT. [L. S.]